United States Patent [19]
Bürger et al.

[11] 4,080,655
[45] Mar. 21, 1978

[54] DEVICE FOR THE TRANSFORMATION OF STEERING CONTROL SIGNALS FROM ONE COORDINATE SYSTEM TO ANOTHER

[75] Inventors: Hans H. Bürger, Kolbermoor; Heinz Schulte, Ottobrunn, both of Germany

[73] Assignee: Messerschmitt-Bölkow-Blohm GmbH, Munich, Germany

[21] Appl. No.: 731,940

[22] Filed: Oct. 13, 1976

[30] Foreign Application Priority Data

Oct. 28, 1975   Germany .............................. 2548125

[51] Int. Cl.² .............................................. G06F 15/50
[52] U.S. Cl. ................................... 364/434; 244/3.21; 364/443; 364/603; 364/731
[58] Field of Search ...................... 235/185, 189, 150.2, 235/150.2 C, 150.27, 150.5; 340/347 SY; 244/3.1, 3.11, 3.15, 3.21, 3.23

[56] References Cited

U.S. PATENT DOCUMENTS

| 3,825,737 | 7/1974 | Croisier | 235/186 |
|---|---|---|---|
| 3,932,740 | 1/1976 | Mueller | 235/189 X |
| 3,952,187 | 4/1976 | Robinson | 235/186 |
| 3,976,869 | 8/1976 | Stella et al. | 235/189 |
| 3,984,672 | 10/1976 | Jones | 235/186 |

*Primary Examiner*—Joseph F. Ruggiero
*Attorney, Agent, or Firm*—Toren, McGeady and Stanger

[57] ABSTRACT

A system for the transformation of steering control signals from a plane cartesian coordinate system to a polar coordinate system is disclosed. The system is designed to be self-contained on board a missile. The system is synchronized with roll position, by virtue of a start pulse and generates pulse increments corresponding to increments of roll angle change. A digital counter counts pulses which are referenced to the missile. The counted pulses are supplied to read-only memories which are pre-programmed with sine and cosine information. A pair of digital-to-analog converters respond to the outputs of the memories. An appropriate Y or Z steering signal is supplied to the converters for multiplication. The outputs of the converters are summed and then supplied to the missile steering device. Means for taking into account the launch of a missile from a mobile launch site is disclosed.

5 Claims, 1 Drawing Figure

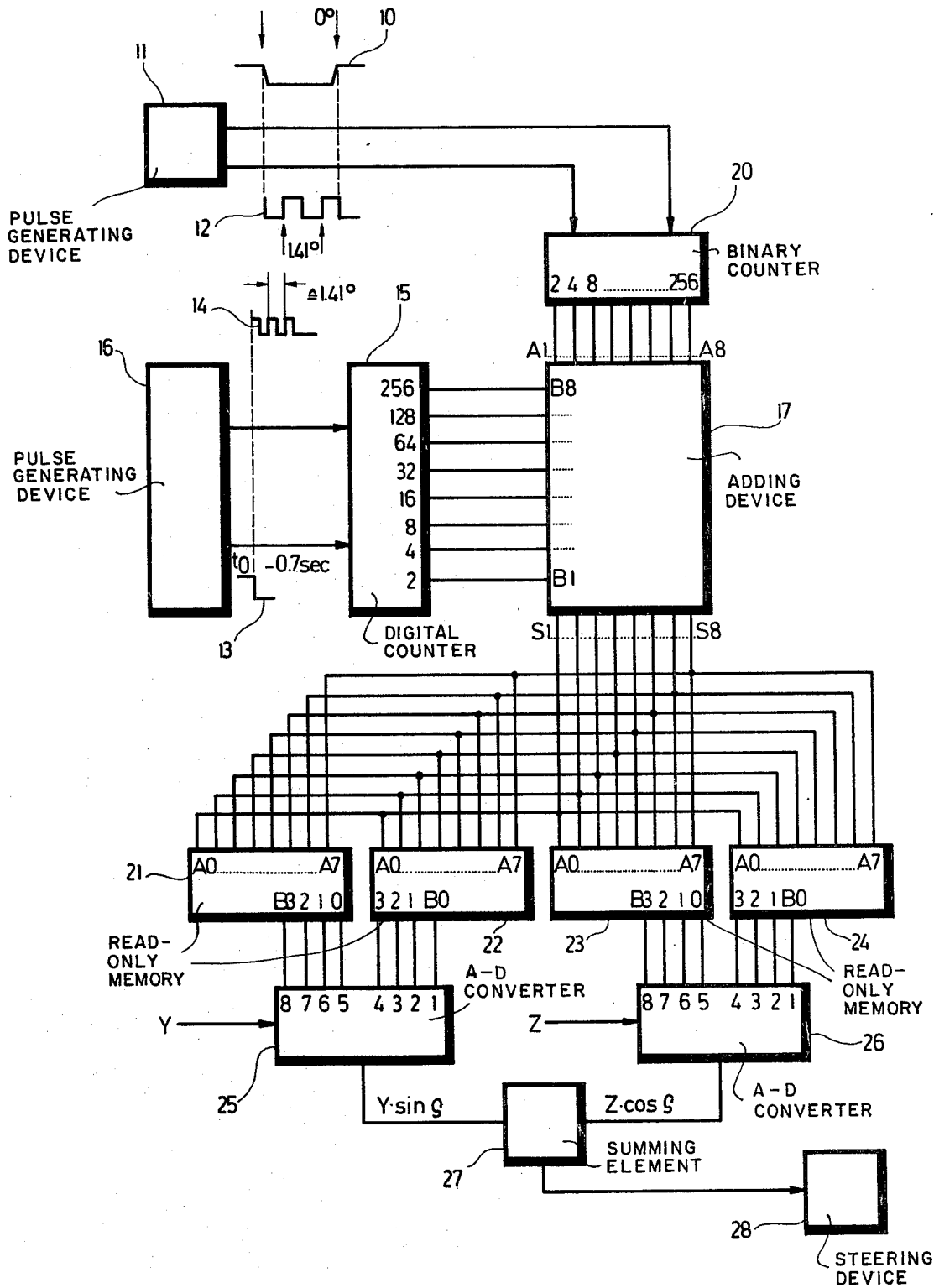

DEVICE FOR THE TRANSFORMATION OF STEERING CONTROL SIGNALS FROM ONE COORDINATE SYSTEM TO ANOTHER

FIELD OF THE INVENTION

The invention pertains to a device for the generation of an electrical control signal, for an aerodynamic body rotating about its longitudinal axis, corresponding to a vector in a polar coordinate system starting with a control signal derived from a plane cartesian coordinate system as well as generating pulses by means of a device such that each pulse generated corresponds to a predetermined increment of roll angle change for the aerodynamic body and also for the generation of a start pulse at the beginning of each new revolution by the aerodynamic body.

BACKGROUND OF THE INVENTION

Rocket-propelled, remote control aerodynamic bodies are caused to roll about their longitudinal axis at launch through grooves in the launching device or through surfaces employed during its flight to compensate for construction inaccuracies and attain a certain degree of longitudinal axis stability.

However, in contrast to the advantage resulting from the aerodynamic body rolling, the activation of the aerodynamic body steering device by means of steering commands necessitates taking into account the instantaneous angular position of the aerodynamic body's steering surface or, for single control member applications, its angular component.

The simplest solution to this requirement appears to be the transformation of the steering signals given in cartesian coordinate system to a polar coordinate system. Coordinate converters have, until now, proved to be very costly regarding power consumption, space requirement and manufacturing cost.

Since the aerodynamic bodies are expendible devices, an aerodynamic body and also a coordinate converter are lost with each launch. To avoid the loss of the coordinate converter, steering techniques for the aerodynamic body have been developed which develop roll position information through the gyrostabilizer or similar instrumentation and which is transmitted in real time to a ground tracking station to readily carry out the coordinate transformation there. The steering commands expressed in the polar coordinate system are then transmitted back to the aerodynamic body where they can become effective in a proper phase relationship.

In addition to the disadvantage that this technique is not applicable to aerodynamic bodies with a defined preprogrammed flight path, the aerodynamic body must be supplied with its own on-board transmitter. Consequently the possibility for external interference with the aerodynamic body's steering is increased. Moreover the cost in terms of weight, power and expense, of the transmitter installation applied.

In an additional technique, the proper phase effectiveness of the steering command is achieved by communicating a steering command only at the given time when the steering mechanism of the rolling aerodynamic body has the correct altitude. A coordinate converter is no longer necessary through this simple measure. To be sure, the limits of this second technique lie in the relatively sluggish steering. An aerodynamic body which for example moves with a velocity of 600 meters/second and has a roll frequency of 5 hertz would, according to this technique, be able to execute a steering maneuver in a specific direction only once every 120 meters of its trajectory. The steering sluggishness can lead to a reduction of mission success for particular aerodynamic body tasks, i.e., in combat with other high speed steerable aerodynamic bodies or aircraft.

It is an object of the invention to provide a device which can provide continuous coordinate transformation within the aerodynamic body in a simple and cost effective manner and which makes it possible to issue, at any desired time of the aerodynamic body's flight, steering commands which are immediately effective and correct with respect to roll position.

SUMMARY OF THE INVENTION

In accordance with the present invention, a system is provided for the generation of an electrical steering command signal for an aerodynamic body rolling about its longitudinal axis. The signal corresponds to a vector in a polar coordinate system and originates from a steering signal derived from a plane cartesian coordinate system. The system generates pulses such that each pulse generated corresponds to a predetermined incremental change in missile roll angle, a start pulse being also generated at the beginning of each revolution of the missile. The system comprises means for generating a start pulse, pulse generating means for providing a train of pulses and a plurality of sine and cosine-programmed, read-only memories. A binary digital counter is also included which is responsive to the start pulse and the train of pulses for counting the pulses of the pulse generating means. The counter is resettable to zero by the start pulse. The counter supplies electrical signals corresponding to the pulse count to the sine- and cosine-programmed, read-only memories. A pair of digital-to-analog converters are included, each being permanently associated with a different axis of a plane cartesian coordinate system. Respective sine and cosine outputs of the read-only memories, which outputs correspond to the instantaneous roll angle are supplied to the digital-to-analog converters. Instantaneous steering signals are also supplied to the digital-to-analog converters, the steering signals are multiplied by the instantaneous voltage value of the associated digital converter. A summing element is included which sums the output signals from the digital-to-analog converter. The output of the summing element is supplied as a steering command on the missile steering device.

For a better understanding of the present invention, reference is made to the accompanying drawing and detailed description of various embodiments of the invention, while the scope of the invention will be pointed out in the amended claims.

BRIEF DESCRIPTION OF THE DRAWING

In the drawing, a block diagram schematic representation of the present invention is shown.

DETAILED DESCRIPTION OF THE INVENTION

The FIGURE generally shows a start pulse 10, provided by the missile-referenced pulse generating device 11, which resets a digital counter 20 to zero at the start of each revolution of a non-illustrated missile (or aerodynamic body).

The digital counting device 20 counts the pulses 12 provided by the pulse generating device 11 until the next start pulse 10 occurs with which the count sequence begins anew. The outputs of the digital counter 20, which for the purpose of the example are the eight outputs 2 thru 256, are connected to the inputs $A_1$ and $A_8$ of the adding device 17. The outputs 2 thru 256 of an additional digital counting device 15 are connected to the inputs $B_1$ through $B_8$ of the adding device 17. The missile elevation which is derived from a pulse generating device 16 associated with the launching platform is supplied to the digital counting device 15 inputs by a pulse corresponding to the moment of launch.

In order to activate the digital counter 15 only in anticipation of a missile launch, provision is made for a start pulse 13 which corresponds to a point in time, for example, several tenths of a second before missile launch and which can be triggered from the non-illustrated launch electronics at launch by way of the pulse generating device 16. The adding device 17 serves to subtract the voltages present at inputs $B_1$ through $B_8$ from those present at inputs $A_1$ thru $A_8$. The adding device 17 provides outputs $S_1$ through $S_8$ which are supplied to the inputs $A_0$ through $A_7$ of the four read-only memories 21, 22, 23, 24.

These read-only memories 21 through 24 are pre-programmed with sine or cosine functions so that, at any given time, a potential appears at their outputs $B_0$ through $B_3$ which is directly proportional to the missile's instantaneous roll angle. The output $B_0$ through $B_3$ of the two read-only memories 21, 22 which simulate the sine function, are connected to a digital-to-analog converter 25. Since two read-only memories 21, 22 or 23, 24 are provided for generating the sine and cosine of the missile roll angle respectively, all the inputs 1 through 8 of the digital analog converter can be utilized.

The digital-to-analog converters 25, 26 are designed as multiplying converters so that, by the introduction of a steering signal $y$ or $z$, the output of the digital-to-analog converters 25, 26 corresponds to the product of the instantaneous trigonometric value of the roll angle and the $y$ or $z$ steering signal. The outputs of the analog-to-digital converters 25, 26 are added in a summing element 27 so that a steering command signal corresponding to a vector in a polar coordinate system appears at the output of the summing element 27. This steering command is supplied to the steering device 28.

In particular, such a steering command is requisite when only one control member steers the missile as, for example, a movable thrust nozzle. If two control members are employed, the summing element 27 can be left out. The outputs of the digital-to-analog converters 25, 26 are then supplied directly as steering commands for the steering device.

It is evident that the binary value of the launch elevation is meaningful only for a missile launch from a mobile launch platform, therefore the circuit elements 15, 16, 17 can be eliminated when launching from a rigid launch platform.

As has been understood from the above description, the objects of the present invention are achieved by a binary digital counter which is resettable to zero by each start pulse and continuously counts the pulses produced by a pulse generating device. The digital counter continuously supplies the current count to the sine and cosine-programmed, read-only memories. The sine and cosine output signals from the read-only memories corresponding to the actual roll angle are supplied to analog-to-digital converters for the sine and cosine functions respectively so that the axis of a plane cartesian coordinate system is permanently associated with each of the two analog-to-digital converters. The actual steering signal can be multiplied by the instantaneous output voltages of the associated digital-to-analog converters. The output voltages obtained from the digital-to-analog converters are summed in a summing element with the resultant summation voltage being supplied to the aerodynamic body's steering device as a steering command.

If the aerodynamic body (or missile) is launched from a mobile launching platform, the instantaneous elevation angle of the missile at the time of launch must be referenced for the coordinate transformation because of the conventional application of a positional gyro as the reference system for roll angle determination.

For this purpose, a pulse count corresponding to the elevation angle whereby each pulse represents the same angle increment size as for the roll angle determination during the missile's flight is subtracted at missile launch time from the pulse count of the digital counter associated with the roll angle determination, which is achieved according to the invention by starting a digital binary code counter which utilizes the same bit count as the digital counter associated with roll position determination in the missile through a start pulse so that the digital counter counts the pulse generated by a pulse generating device associated with the launching platform. The output voltages of this digital counter drive the inputs of the summing device whose other inputs are provided by the voltage outputs of the digital counter associated with the roll position determination in the missile. An algebraic summing device subtracts the output voltages of this digital counter from those of the digital counter associated with the roll position determination in the missile. These difference voltages are supplied to the read-only memories.

It is particularly advantageous that all the component parts utilized are commercially available circuit elements, so that the coordinate transformation can be implemented in the missile for minimum cost expenditure and so that the loss of the device by launching the missile is not particularly significant in relationship to the total cost of the missile. In this regard, digital binary counters 15 and 20, for example, is MC 14040 summing device 17 may be composed of two MC 14008 AL read-only memories 21, 22, 23, 24 may be of the type MCM 14524 AL digital-to-analog converters may be AD 7520; summing element 27 may be MC 1741. The pulse generating device 11 for supplying start pulse 10 and pulses 12 is a rotary encoder ROD 6/77.2 of Dr. Johannes Heidenhain of Traunreut, Germany. Consequently, the above-described invention provides a simple and economic method by which the missile immediately reacts to steering commands correctly with respect to roll position during every phase of flight and without any adverse effect on steering behavior by the roll frequency or flight velocity.

While specific embodiments of the invention have been shown and described in detail to illustrate the application of the inventive principles, it will be understood that the invention may be embodied otherwise without departing from such principles.

What is claimed is:

1. A system for the generation of an electrical steering command signal for an aerodynamic missile rolling about its longitudinal axis, which signal corresponds to a vector in a polar coordinate system and originates from a steering signal derived from a plane cartesian coordinate system, said system also for generating pulses such that each pulse generated corresponds to a predetermined incremental change in missile roll angle and for generating a start pulse at the beginning of each revolution of the missile, said system comprising:

pulse generating means for generating a start pulse synchronized to a missile rolling about its longitudinal axis and for providing a train of pulses corresponding to the incremental change in missile roll angle;

a plurality of sine an cosine-programmed, read-only memories having respective sine and cosine outputs;

a binary digital counter respective to said start pulse and said train of pulses for counting the pulses of said train of pulses of said pulse generating means, said counter being resettable to zero by said start pulse, said counter supplying electrical signals corresponding to the pulse count to said sine and cosine-programmed read-only memories so that said respective sine and cosine outputs correspond to instantaneous roll angle position;

a pair of digital-to-analog converters, each of the digital converters being permanently associated with a different axis of a plane cartesian coordinate system; said respective outputs of said read-only memories being supplied to said digital-to-analog converters; instantaneous steering signals also being supplied to said digital-to-analog converters, said steering signals for being multiplied by the instantaneous voltage value of the associated digital converter; and a summing element, the signals obtained at the outputs of said digital-to-analog converters being summed in said summing element, the output of said summing element being supplied as a steering command for the missile.

2. A system for the generation of an electrical steering command signal for an aerodynamic missile rolling about its longitudinal axis, which signal corresponds to a vector in a polar coordinate system and originates from a steering signal derived from a plane cartesian coordinate system, said system also for generating pulses such that each pulse generated corresponds to a predetermined incremental change in missile roll angle and for generating a start pulse at the beginning of each revolution of the missile, said system comprising:

pulse generating means for generating a start pulse synchronized to a missile rolling about its longitudinal axis and for providing a train of pulses corresponding to the incremental change in missile roll angle;

a plurality of sine and cosine-programmed, read-only memories having respective sine and cosine outputs;

a binary digital counter responsive to said start pulse and said train of pulses for counting the pulses of said train of pulses of said pulse generating means, said counter being resettable to zero by said start pulse, said counter supplying electrical signals corresponding to the pulse count to said sine and cosine-programmed read-only memories so that said respective sine and cosine outputs correspond to instantaneous roll angle position;

a pair of digital-to-analog converters, each of the digital converters being permanently associated with a different axis of a plane cartesian coordinate system; said respective outputs of said read-only memories being supplied to said digital-to-analog converters; instantaneous steering signals also being supplied to said digital-to-analog converters, said steering signals for being multiplied by the instantaneous voltage value of the associated digital converter; and a summing element, the signals obtained at the outputs of said digital-to-analog converters being summed in said summing element, the output of said summing element being supplied as a steering command for the missile;

and also including a second pulse generating means, a second binary digital counter and a digital summing device, said second counter being initiated by a start pulse utilizing the same bit count as said counter associated with missile roll position determination, said second counter summing the pulses generated by the second pulse generating device which is associated with a launch platform, output voltages of said second counter being supplied to the inputs of said digital summing device, the output voltages of said missile roll position counter also being supplied to said digital summing device, said summing device subtracting the output voltages of said second counter from said roll position counter output voltages, the output of said summing device being the difference therebetween and being supplied to the read-only memories.

3. The system of claim 1 wherein there are four read-only memories, two read-only memories being programmed with sine information and two with cosine information, the outputs of the sine-programmed, read-only memory being supplied to one digital-to-analog converter, the outputs of the cosine-programmed, read-only memory being supplied to the other digital-to-analog converter.

4. A system according to claim 1 wherein the output voltages of the digital-to-analog converters are directly connected to a missile steering device as a steering command.

5. A system according to claim 1 wherein said pulse generating means is a rotary encoder.

* * * * *